Nov. 29, 1927.
J. W. STARK
GRASS SEED SCARIFIER
Filed Oct. 12, 1925
1,651,300
2 Sheets-Sheet 2
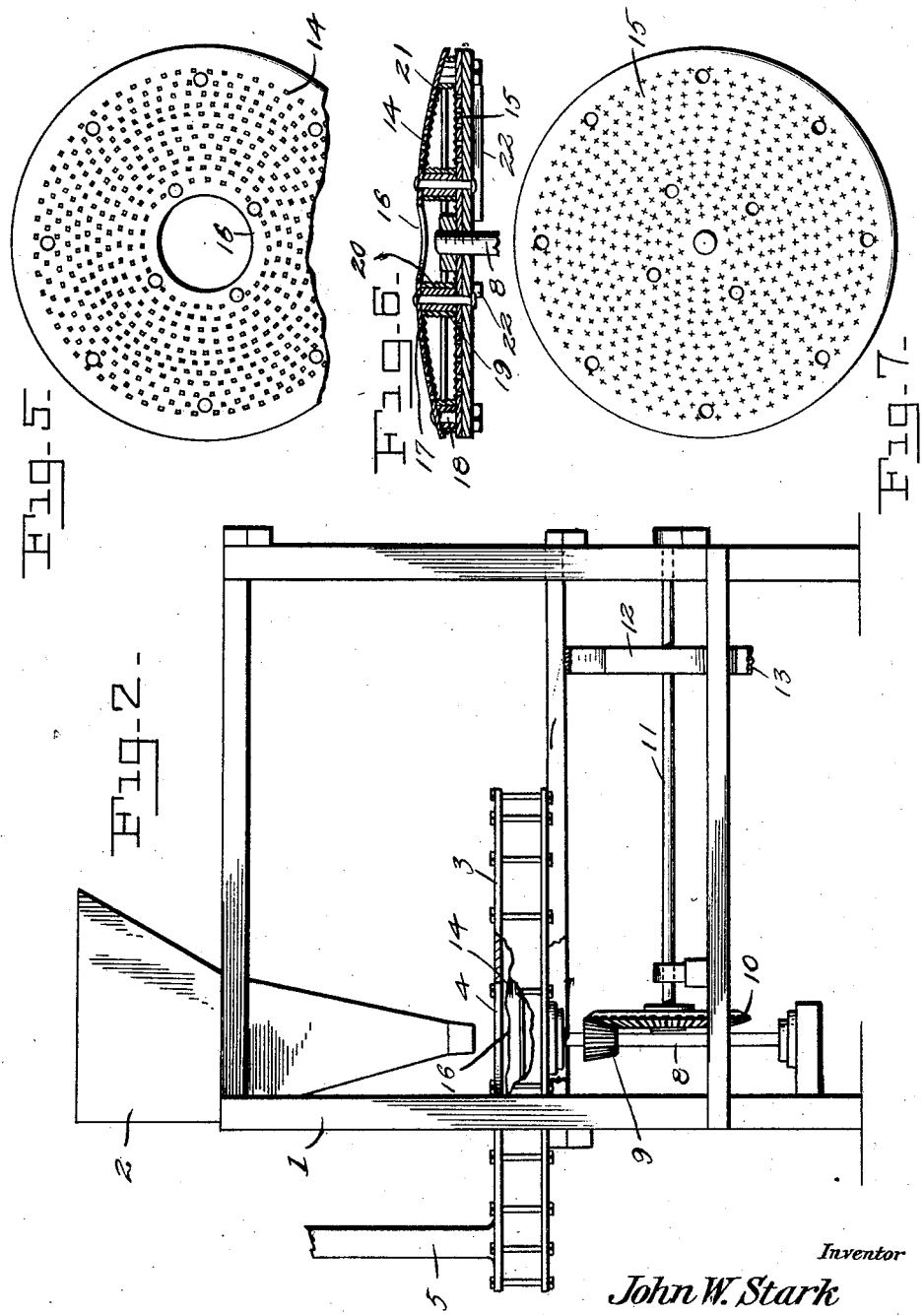
Inventor
John W. Stark
by Jacobi & Jacobi
Attorney Patented Nov. 29, 1927.

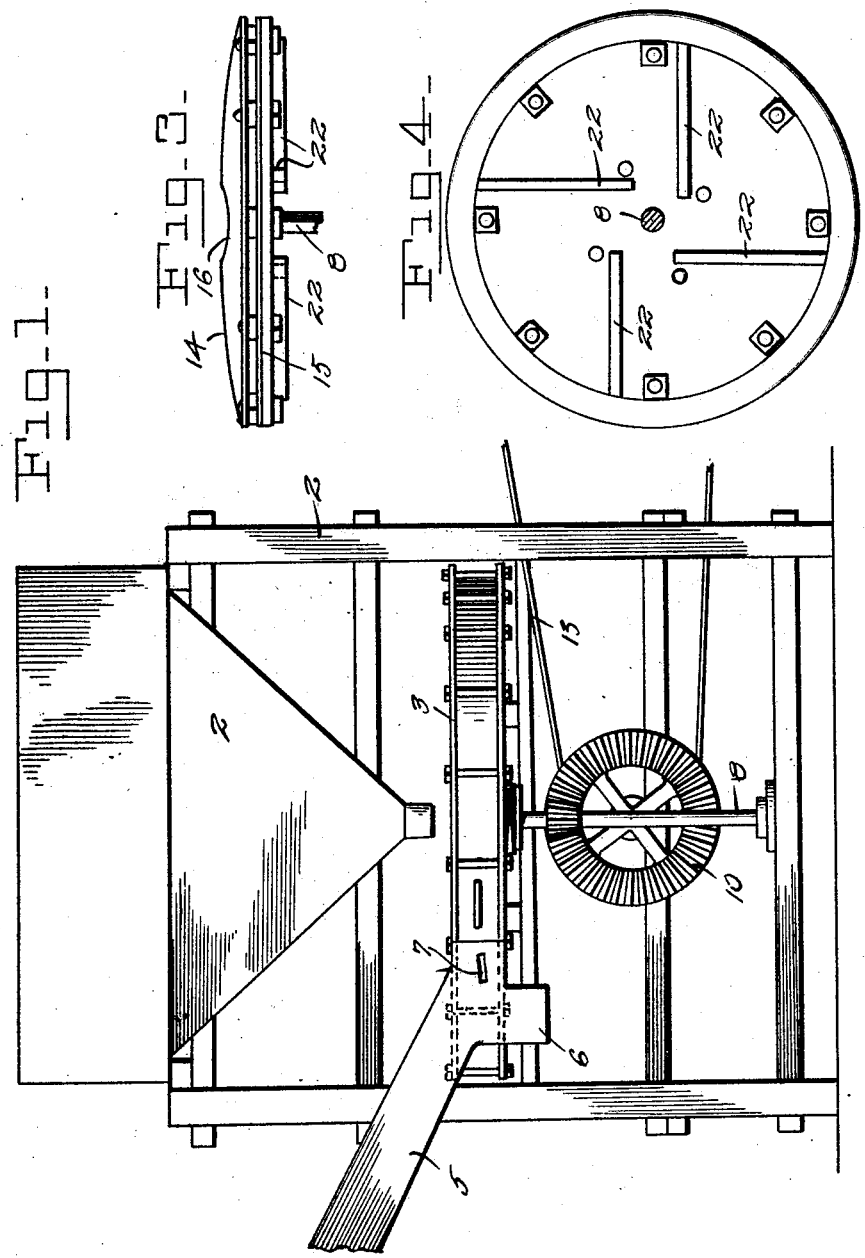

1,651,300

UNITED STATES PATENT OFFICE.

JOHN W. STARK, OF KENSINGTON, MINNESOTA.

GRASS-SEED SCARIFIER.

Application filed October 12, 1925. Serial No. 61,962.

This invention relates to seed scarifiers and is especially adapted to be used for treating small seed as for instance, grass seed and it consists in the novel features hereinafter described and claimed.

An object of the invention is to provide a machine or mill of the character stated and which may be conveniently and economically used for puncturing or scarifying the outer shell or skin of the seed in order that when the seed is planted or sown in the soil the seed may readily absorb the moisture and sprout quickly.

With the above object in view the scarifier includes a frame having a seed hopper mounted thereon and a casing mounted thereon below the hopper. The casing is circular in plan and is provided at its top side with an opening which is located below the outlet of the hopper. A burr is journaled for rotation in the casing and consists of upper and lower disks spaced from each other and provided at their inner surfaces with teeth or prongs. The upper disk is convexed and the lower disk is flat or plane. The said burr is mounted upon a shaft and means are provided for rotating the shaft. Fan blades are carried at the under surface of the lower plane disk and are also housed within the casing. An outlet pipe is connected with the peripheral portion of the casing and is upwardly and outwardly inclined. The trash is adapted to be discharged from the upper outer end of the said pipe and the pipe is provided at its under side and at a point near the casing with an outlet opening through which the scarified seed may pass.

The disks are held in spaced relation by means of posts and these posts are surrounded by collars or sleeves also having outstanding teeth or prongs.

The arrangement is such that when the seed is permitted to flow from the hopper into the casing and between the disks the seed comes in contact with the teeth or prongs and the outer coatings of the seed are punctured or scarified. The seed is passed by centrifugal force toward the periphery of the burr and the casing and the draught of air which is created by the fan blades encounters the scarified seed and carries the same through the pipe together with the trash and the seed is separated from the trash as hereinbefore described and is in condition for planting as before indicated.

In the accompanying drawings:—

Figure 1 is a side elevational view of the seed scarring machine or apparatus.

Figure 2 is a similar view looking at the same at a side at right angles to that shown in Figure 1.

Figure 3 is an edge elevational view of a burr used in the scarifier.

Figure 4 is an under plan view of the burr shown in Figure 3.

Figure 5 is a top plan view of the upper disk used in the structure of the burr.

Figure 6 is a transverse sectional view of the burr.

Figure 7 is a plan view of the lower disk used in the burr structure.

As illustrated in the accompanying drawings the seed scarifying apparatus comprises a frame 1 upon which is mounted a seed hopper 2. A casing 3 is also mounted upon the frame 1 and is provided at its top side and at its center with an opening 4 which is located below the lower outlet end of the hopper 2. An upwardly and outwardly inclined delivery pipe 5 is connected with the peripheral portion of the casing 3 and the said pipe is provided at its under side and at a point between its ends with a seed outlet spout 6. A separator plate or board 7 is located in the inner portion of the pipe 5 and is approximately horizontally disposed and adapted to separate the chaff or cuttings from the seed as hereinafter described in order that the cuttings or trash may be passed out of the pipe 5 at the upper delivery end thereof and the scarified seed may be permitted to fall from the pipe 5 through the spout 6.

A vertically disposed shaft 8 is journaled upon the frame 1 and its upper end portion enters the casing 3 through the center of the lower side thereof. The shaft 8 carries a beveled pinion 9 the teeth of which mesh with the teeth of a beveled gear wheel 10 mounted upon a shaft 11 which in turn is journaled upon the frame 1. A belt pulley 12 is mounted upon the shaft 11 and a belt 13 is trained around the said pulley and may be trained around a pulley upon a counter shaft or a pulley wheel upon an engine or other power means (not shown).

A burr member is mounted upon the upper end of the shaft 8 and is housed within the casing 3. The burr member consists of spaced upper and lower disks 14 and 15. The disk 14 is convexed and the disk 15 is flat or plane. The disk 14 is provided at its center with an opening 16 which is located below the opening 4 in the top of the casing 3.

The disks 14 and 15 are held in spaced relation by means of posts 17 which are interposed between the inner surfaces of the disks through which bolts 18 pass and which serve as means for holding the disks in position at the ends of said posts. The posts 17 are surrounded by sleeves 19 which are provided at their outer surfaces with outstanding teeth or prongs 20. The inner surfaces of the disks 14 and 15 are provided with prongs or teeth 21 which are formed by punching the metal up in a usual manner. Disk 15 is provided at its lower or under side with a series of fan blades 22 the outer ends of which are disposed toward the periphery of the disk and the inner ends are disposed toward the intermediate portion thereof.

In operation the shafts 11 and 8 are rotated whereby the burr of which the disks 14 and 15 are component parts is rotated in the casing 3. At the same time the seed is permitted to gravitate from the hopper 2 through the registering openings 4 and 16 and the seed enters the space between the disks 14 and 15. As the said disks are rotating the seed will come in contact with the teeth 21 and 20 and are forced against the said teeth by centrifugal force. Thus the teeth will puncture or scarify the skin of the seed and the seed is passed by centrifugal force beyond the edges of the disks 14 and 15 into the peripheral portion of the casing 3. The seed thus deposited in the casing are carried around by the fan blades and at the same time the said blades, being in motion, create a forced draught in the casing which is expelled therefrom through the pipe 5 carrying with it the seed and the trash. The trash is separated from the seed by the board 7 and passes up through the upper end of the pipe and passes out of the same. The seed passes along the lower side of the pipe and drops through the spout 6.

Therefore it will be seen that a simple and efficient apparatus is provided for easily and cheaply scarifying small seed as for instance grass seed and for placing the same in condition to be planted in the soil in order that it may quickly absorb the moisture and sprout promptly.

While I have particularly described the elements best adapted to perform the functions set forth, it is obvious that various changes in form, proportion and in the minor details of construction may be resorted to, without departing from the spirit or sacrificing any of the principles of the invention.

Having described the invention what is claimed is:—

A seed scarifier comprising a frame, a casing supported in said frame and having an inlet opening in its top and an outlet, a burr mounted for rotation in said casing, upper and lower disks included in said burr, bolts connecting the disks together, posts about the bolts and spacing the disks with respect to each other, sleeves surrounding the posts, teeth formed on the sleeves and the confronting faces of the disks respectively, the upper disk being convex and being formed with an opening registering with the inlet opening of the casing, means for rotating said burr and fan blades provided on the underside of the lower disk.

In testimony whereof I affix my signature.

JOHN W. STARK.